United States Patent
Furuya

[19]

[11] Patent Number: 5,870,239
[45] Date of Patent: Feb. 9, 1999

[54] MAGNETIC REPRODUCTION APPARATUS PROVIDED WITH A CROSS TALK REDUCTION SYSTEM

[75] Inventor: Hideaki Furuya, Osaka, Japan

[73] Assignee: U.S. Philips Corporation, New York, N.Y.

[21] Appl. No.: 656,150

[22] Filed: May 31, 1996

[30] Foreign Application Priority Data

May 31, 1995 [JP] Japan ..................................... 7-158451

[51] Int. Cl.$^6$ ...................................................... G11B 5/02
[52] U.S. Cl. ............................... 360/55; 360/21; 386/23; 386/115
[58] Field of Search ................................. 386/22, 23, 115; 360/21, 55, 7, 46, 67; 369/107, 124, 60

[56] References Cited

U.S. PATENT DOCUMENTS

| 3,513,268 | 5/1970 | Jolin | 369/107 X |
| 5,243,474 | 9/1993 | Mitsuhashi | 360/70 |

FOREIGN PATENT DOCUMENTS 54-73615  6/1979  Japan ........................................ 360/21

*Primary Examiner*—Aristotelis M. Psitos
*Assistant Examiner*—Alan Faber
*Attorney, Agent, or Firm*—Edward W. Goodman

[57] ABSTRACT

A magnetic reproduction apparatus with a cross-talk reduction system that includes first and second magnetic heads, wherein the distance between the first magnetic head which has a plus azimuth angle and the second magnetic head which has a minus azimuth angle is provided so that the second head scans a track which is previously scanned by the first magnetic head. The apparatus also provides (i) a delaying circuit for delaying a first reproduction signal of the first magnetic head, (ii) a first filter for extracting a cross-talk component from an output of the delaying circuit, (iii) a second filter for extracting a cross-talk component from a second reproduction signal of the second magnetic head, (iv) a first adder for adding the second reproduction signal's cross-talk component which is inverted and the output of the delaying circuit, and (v) a second adder for adding the first reproduction signal's cross-talk component which is inverted and the second reproduction signal.

5 Claims, 3 Drawing Sheets

5,870,239

MAGNETIC REPRODUCTION APPARATUS PROVIDED WITH A CROSS TALK REDUCTION SYSTEM

BACKGROUND OF THE INVENTION

The present invention relates to a magnetic reproduction apparatus provided with a crosstalk reduction system for performing a magnetic reproducing operation with use of at least two magnetic heads.

In conventional magnetic reproduction apparatus, such as embodied in the form of a VTR or a DAT reproduction apparatus, a magnetic head scans a target recording track and also part of tracks adjacent thereto at the same time. This for the reason that, generally, the scanning width of the magnetic head is larger than the recording track. When the width of the magnetic head is set large in this way, the scanning of the target track can be attained even when the scanning position of the magnetic head is shifted to any one of the pair of the adjacent tracks.

FIG. 4 explains the scanning condition of a prior art ordinary magnetic head. As illustrated, a magnetic head 1 having a plus azimuth angle scans a track Ta recorded on a magnetic tape T with a plus azimuth angle. During the scanning operation, the magnetic head 1 also scans part of tracks Tb1 and Tb2 having minus azimuth angles and adjacent to the track Ta.

When the magnetic head 1 scans the tracks Tb1 and Tb2 having different azimuth angles, the magnetic head also reproduces, in addition to a main signal based on the track Ta, a subsignal (crosstalk component) based on the tracks Tb1 and Tb2. The crosstalk component, which is a noise component of the main signal, acts to reduce the S/N ratio of the main signal. An example of circuits for improving the S/N ratio is a crosstalk reduction circuit.

As an example of such conventional ordinary crosstalk reduction circuits, there is proposed a circuit which extracts crosstalk components from latest (based on the latest scanning track) and past reproduction signals, inverts one of polarities of this two types of crosstalk components for addition thereof to thereby realize reduction (cancellation) of the crosstalk components. In this connection, the past reproduction signal refers to a signal which corresponds to a past scanned track different from the latest scanning track.

Scanning different tracks, in general, produces different contents (waveforms) of their crosstalk components. That is, as mentioned above, even when the addition of two types of crosstalk components of different tracks, it has been difficult to sufficiently reduce (cancel) the crosstalk components. In other words, it has been impossible to realize sufficient improvement in the S/N ratio of a reproduction signal.

SUMMARY OF THE INVENTION

In accordance with the present invention, there is provided a magnetic reproduction apparatus for reproducing an information signal from a track on a record carrier, the apparatus comprising first and second magnetic heads for scanning tracks on the magnetic record carrier so as to obtain a first and a second reproduction signal respectively, the first and second magnetic heads having different azimuth angles, which is characterized in that the first and second magnetic heads are positioned in such a position relative to each other that they both scan the same track, where the second head scans the track a predetermined time delay after the first head, the apparatus further comprising delay means for delaying the first reproduction signal of the first head for said predetermined time delay, first filter means for filtering a first cross-talk component which is included in the second reproducing signal, and first signal combination means for combining the first cross-talk component and the delayed first reproduction signal in a subtractive way, so as to obtain a cross-talk reduced first output signal.

In a preferred embodiment, the magnetic reproduction apparatus is further characterized in that it further comprises second filter means for filtering a second cross-talk component which is included in the delayed first reproduction signal, and second signal combination means for combining the second cross-talk component and the second reproducing signal in a subtractive way, so as to obtain a cross-talk reduced second output signal.

In the reproduction apparatus having a cross-talk reduction circuit as mentioned above, a single track is scanned by two magnetic heads having mutually different azimuth angles. Two types of reproduction signals are generated for a single track. Since two types of crosstalk components contained in these two types of reproduction signals are for the identical track, the crosstalk components have nearly the same contents (waveform). When one of these signals are inverted in polarity and then subjected to an additional operation, reduction in the crosstalk components or cancellation in the waveforms can be realized.

DETAILED DESCRIPTION OF THE PREFERRED EMBODIMENTS

A crosstalk reduction in accordance with of the present invention is realized by combining a plus azimuth head and a minus azimuth head and a processing circuit for processing the output signals of the plus and minus azimuth heads.

Figure 1A:
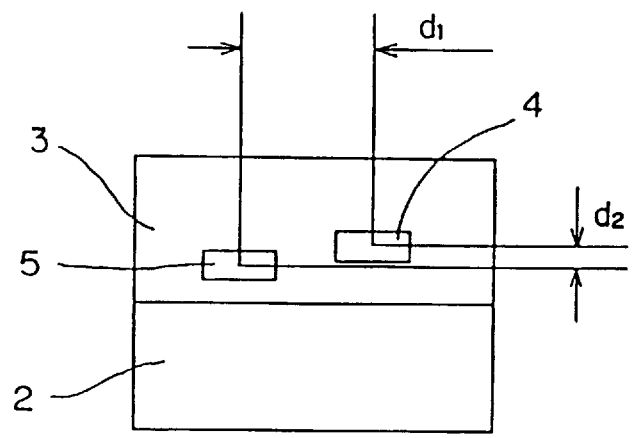
FIGS. 1a and 1b are schematic diagrams of a rotary cylinder of a reproducing apparatus in accordance with the present invention.
Figure 1B:
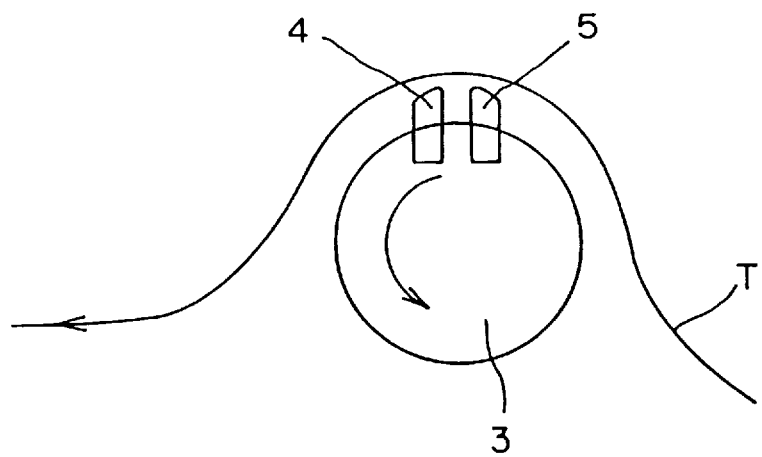

FIGS. 1a and 1b are schematic diagrams of a rotary cylinder of a reproduction apparatus in accordance with the present invention.

More in detail, FIG. 1(a) is a view of a stationary drum 2 (rotary cylinder 3) as viewed from its side direction. Rotatably mounted on a top of the stationary drum 2 are a plus azimuth head (first magnetic head) 4 and a minus azimuth head (second magnetic head) 5. The heads 4 and 5 are provided as spaced from the rotary cylinder 3 by a distance d1 along its circumferential direction and by a distance d2 along its axial direction.

FIG. 1(b) is a view of the rotary cylinder 3 as viewed from its top side. A magnetic tape T is wound around the rotary cylinder 3. Tracks $T_a$, $T_b$, . . . are provided on the magnetic tape T and the tracks are scanned by the heads 4 and 5, as the magnetic tape is run and the rotary cylinder 3 is rotated.

The distances d1 and d2 set between the heads 4 and 5 are for realizing the scanning of the track scanned by the head 4 a predetermined time later by the head 5. That is, the setting of the distances d1 and d2 causes the heads 4 and 5 to scan the same track, though different in the scanning timing.

Figure 2:
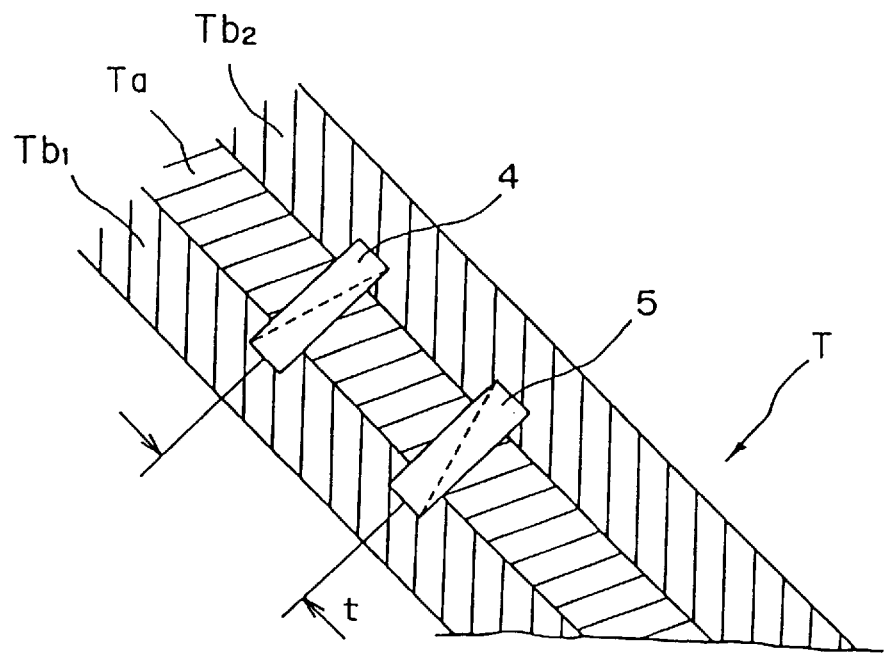
FIG. 2 is a diagram for explaining how magnetic heads in the present invention scan the tracks.
Figure 4:
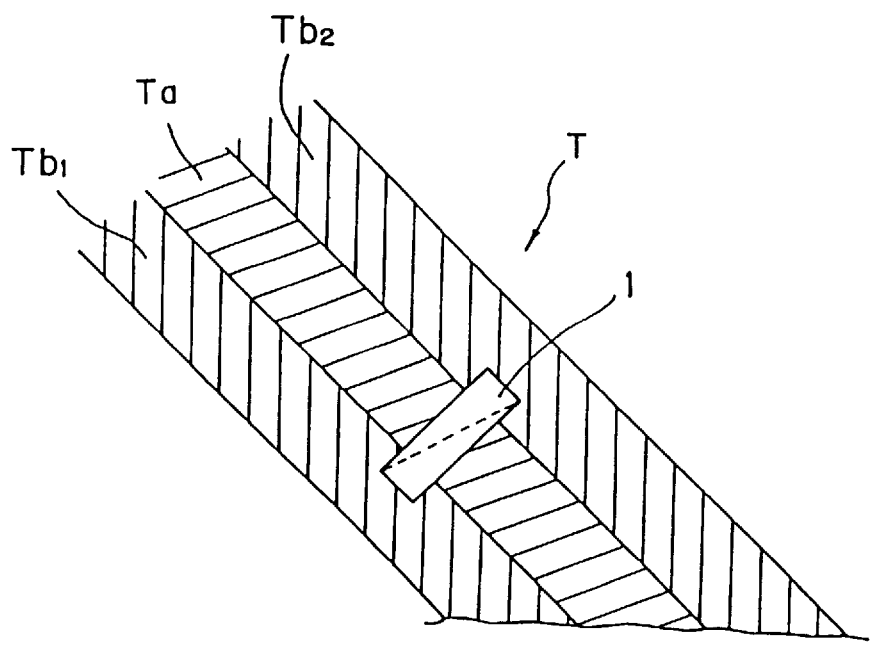
FIG. 4 is a diagram for explaining how conventional ordinary magnetic heads scan the tracks.

FIG. 2 is a diagram for explaining how the magnetic heads in the present invention scan. As illustrated, the head 5 scans a position of a track scanned by the head 4 after passage of about time t. The azimuth of the head 4 is equal to the azimuth of the head with which the signals were originally recorded in the track $T_a$, whereas, the head 5 has an azimuth equal to the azimuth of the head with which the signals were originally recorded in the tracks $T_{b1}$ and $T_{b2}$. The drawing shows how the heads 4 and 5 scan the plus azimuth track $T_a$. In this case, a reproduction signal (first reproduction signal) of the head 4 is actually handled as a reproduction signal and then subjected at a signal processing circuit of a later stage so as to obtain the cross-talk reduced output signal. A reproduction signal (second reproduction signal) of the head 5 is used to reduce a crosstalk component contained in the first reproduction signal. Similarly, when the heads 4 and 5 scan, for example, the minus azimuth track $T_{b1}$, a second reproduction signal of the head 5 is actually handled as a reproduction signal; while the first reproduction signal of the head 4 is used to reduce a crosstalk component contained in the second reproduction signal.

Figure 3:
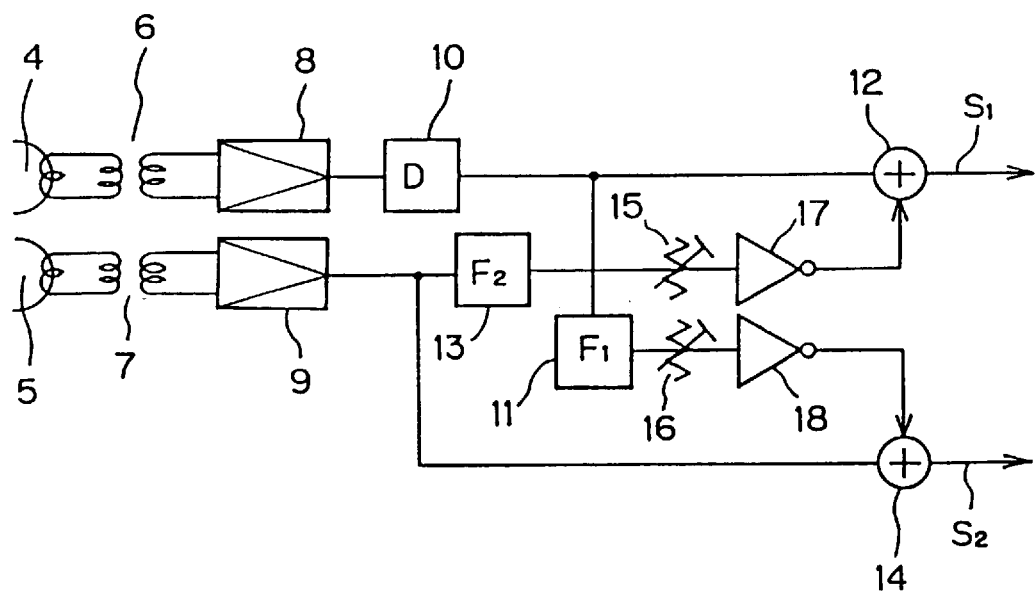
FIG. 3 is a block diagram of a cross-talk reduction circuit.

FIG. 3 conceptionally shows a crosstalk reduction system used in the apparatus in accordance with the present invention.

As illustrated, plus and minus azimuth heads (first and second magnetic heads) 4 and 5 are connected to amplification circuits 8 and 9 through rotary transformers 6 and 7. The amplification circuit 8 is connected at its outputs to a filter (F1) 11 and a first adder circuit 12 through a delay circuit (D) 10. The amplification circuit 9 is connected at its outputs to a filter (F2) 13 and a second adder circuit 14. The filters 11 and 13 are connected to first and second inverters 17 and 18 through variable resistors 15 and 16 for adjusting the levels of the respective crosstalk components respectively. The inverters 17 and 18 are connected at their outputs to the first and second adder circuits 12 and 14. An inverter, such as the inverter 17, and a corresponding adder circuit, such as the adder circuit 12, function in fact as a signal combination circuit which combines the two signals supplied to its inputs in a subtractive way. The first adder circuit 12 outputs a first output signal S1 based on the first reproduction signal of the head 4. Similarly, the second adder circuit 14 outputs a second output signal S2 based on the second reproduction signal of the head 5.

The delay circuit 10 delays the signal supplied to its input by a delay time t, which is equal to the delay between the two heads 4 and 5 when scanning a track, such as the track $T_a$. The filters 11 and 13 are band pass filters through which a desired band of signals and more concretely the crosstalk components contained in the reproduction signals can be retrieved. The inverters 17 and 18 act to invert the polarity of the respective crosstalk components. The first adder circuit 12 adds the first reproduction signal and the second reproduction signals crosstalk component subjected to the polarity inversion to reduce (cancel) the crosstalk component contained in the first reproduction signal. Similarly, the second adder circuit 14 adds the second reproduction signal and the first reproduction signal's crosstalk component subjected to the polarity inversion to reduce (cancel) the crosstalk component contained in the second reproduction signal.

Explanation will now be made in connection with a case where the heads 4 and 5 scan the plus azimuth track $T_a$ as shown in FIG. 2. The reproduction signal of the head 4 is amplified at the amplification circuit 8 to a predetermined level and then delayed at the delay circuit 10 by a delay corresponding to the delay time t. This delay enables phase coincidence of two signals input to the first adder circuit 12, that is, supply of the signals based on the same scanning position to the first adder circuit 12 at the same time.

The delayed reproduction signal issued from the delay circuit 10 based on the first reproduction signal obtained through the scanning of the head 4 is input to the adder circuit 12 and filter 11. The second reproduction signal obtained through the scanning of the head 5 and issued from the amplification circuit 9, on the other hand, is input to the adder circuit 14 and filter 13. When the heads 4 and 5 scan the plus azimuth track $T_a$, the output signal S1 issued from the adder circuit 12 is used in a circuit of a later stage. That is, the adder circuit 12 reduces (cancels) the crosstalk component contained in the delayed reproduction signal (first reproduction signal) and outputs it to a circuit of a later stage as the output signal S1.

Meanwhile, when the heads 4 and 5 scan, e.g., the minus azimuth tracks $T_{b1}$ and $T_{b2}$, the output signal S2 of the adder circuit 14 is used in a circuit of a later stage. That is, the adder circuit 14 reduces (cancels) the crosstalk component contained in the second reproduction signal and outputs it in a circuit of a later stage as the output signal S2.

As has been explained in the foregoing, when a single track is scanned by the plus and minus azimuth heads to generate two reproduction signals therefrom for the single track, cross-talk components contained in these reproduction signals have nearly the same waveform. When one of the crosstalk components nearly coincided in waveform is subjected to the polarity inversion and these crosstalk components are added together, the crosstalk components can be reliably reduced (cancelled).

What is claimed is:

1. A magnetic reproduction apparatus for reproducing an information signal from a selected track on a record carrier having a plurality of tracks, the apparatus comprising first and second magnetic heads for scanning tracks on the record carrier so as to obtain a first and a second reproduction signal respectively, the first and second magnetic heads having different azimuth angles and being positioned relative to each other so that both magnetic heads scan the selected track, the second magnetic head scanning the selected track a predetermined time delay after the first magnetic head, the apparatus further comprising delay means for delaying the first reproduction signal of the first magnetic head for said predetermined time delay, first filter means for filtering a first cross-talk component which is included in the second reproduction signal, and first signal combination means for combining the first cross-talk component and the delayed first reproduction signal in a subtractive way, so as to obtain a cross-talk reduced first output signal.

2. A magnetic reproduction apparatus as claimed in claim 1, characterized in that it further comprises second filter means for filtering a second cross-talk component which is included in the delayed first reproduction signal, and second signal combination means for combining the second cross-talk component and the second reproduction signal in a subtractive way, so as to obtain a cross-talk reduced second output signal.

3. A magnetic reproduction apparatus as claimed in claim 2, characterized in that the second combination means comprises an inverter for inverting the second cross-talk component and an adder for combining the inverted second cross-talk component and the second reproduction signal.

4. A magnetic reproduction apparatus as claimed in claim 3, characterized in that the first combination means comprises an inverter for inverting the first cross-talk component and an adder for combining the inverted first cross-talk component and the first reproduction signal.

5. A magnetic reproduction apparatus as claimed in claim 1, characterized in that the first combination means comprises an inverter for inverting the first cross-talk component and an adder for combining the inverted first cross-talk component and the first reproduction signal.

* * * * *